United States Patent
Okanishi et al.

(10) Patent No.: US 12,161,978 B2
(45) Date of Patent: Dec. 10, 2024

(54) COMPOSITE SEMIPERMEABLE MEMBRANE

(71) Applicant: TORAY INDUSTRIES, INC., Tokyo (JP)

(72) Inventors: Ryosuke Okanishi, Ehime (JP); Shunsuke Tabayashi, Ehime (JP); Yuta Amano, Ehime (JP); Takao Sasaki, Ehime (JP); Masaki Higashi, Ehime (JP); Takashi Yoshino, Ehime (JP); Hiroki Minehara, Shiga (JP); Hiroaki Tanaka, Shiga (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 18/287,786

(22) PCT Filed: Apr. 22, 2022

(86) PCT No.: PCT/JP2022/018638
§ 371 (c)(1),
(2) Date: Oct. 20, 2023

(87) PCT Pub. No.: WO2022/225061
PCT Pub. Date: Oct. 27, 2022

(65) Prior Publication Data
US 2024/0278184 A1 Aug. 22, 2024

(30) Foreign Application Priority Data
Apr. 22, 2021 (JP) ................................ 2021-072381

(51) Int. Cl.
*B01D 69/02* (2006.01)
*B01D 69/10* (2006.01)
(Continued)

(52) U.S. Cl.
CPC ........... *B01D 69/107* (2022.08); *B01D 69/02* (2013.01); *B01D 71/56* (2013.01); *C02F 1/44* (2013.01);
(Continued)

(58) Field of Classification Search
CPC ...... B01D 69/107; B01D 69/02; B01D 71/56; B01D 2325/04; B01D 2325/06; C02F 1/44; C02F 2103/08
See application file for complete search history.

(56) References Cited

U.S. PATENT DOCUMENTS 5,258,203 A 11/1993 Arthur
5,733,602 A 3/1998 Hirose et al.
(Continued)

FOREIGN PATENT DOCUMENTS

CN 101874989 A 11/2010
CN 102781560 A 11/2012
(Continued)

OTHER PUBLICATIONS

Machine translation of WO2016136966A1.*
(Continued)

*Primary Examiner* — Benjamin L Lebron
(74) *Attorney, Agent, or Firm* — Birch, Stewart, Kolasch & Birch, LLP (57) ABSTRACT

The present invention relates to a composite semipermeable membrane including: a support membrane; and a separation functional layer provided on the support membrane, in which the separation functional layer includes a thin membrane, the thin membrane has a fold structure including a plurality of protrusions having a height of 10 nm or more, and in the fold structure, a ratio (T100/T25) is less than 0.95, where T25 is a thickness of the thin membrane in a region of 0% to 25% of the height of the protrusion and T100 is a
(Continued)

thickness of the thin membrane in a region of 50% to 100% of the height of the protrusion.

6 Claims, 3 Drawing Sheets

(51) Int. Cl.
  *B01D 71/56* (2006.01)
  *C02F 1/44* (2023.01)
  *C02F 103/08* (2006.01)

(52) U.S. Cl.
  CPC ...... *B01D 2325/04* (2013.01); *B01D 2325/06* (2013.01); *C02F 2103/08* (2013.01)

(56) References Cited

U.S. PATENT DOCUMENTS

| | | | |
|---|---|---|---|
| 10,350,553 | B2 | 7/2019 | Kamada et al. |
| 2007/0284309 | A1 | 12/2007 | Tomioka |
| 2012/0305473 | A1 | 12/2012 | Ogawa et al. |
| 2014/0034569 | A1 | 2/2014 | Yoo et al. |
| 2015/0068963 | A1 | 3/2015 | Yoo et al. |
| 2016/0303514 | A1 | 10/2016 | Tabayashi et al. |
| 2017/0136422 | A1 | 5/2017 | Ogawa et al. |
| 2018/0318771 | A1 | 11/2018 | Koiwa et al. |
| 2019/0247800 | A1 | 8/2019 | Ogawa et al. |
| 2019/0282967 | A1 | 9/2019 | Zhang et al. |
| 2020/0061548 | A1 | 2/2020 | Miyabe et al. |

FOREIGN PATENT DOCUMENTS

| | | | | |
|---|---|---|---|---|
| CN | 105658312 | A | 6/2016 | |
| CN | 106659986 | A | 5/2017 | |
| CN | 107921378 | A | 4/2018 | |
| JP | 6-47260 | A | 2/1994 | |
| JP | 8-224452 | A | 9/1996 | |
| JP | 2000-33243 | A | 2/2000 | |
| JP | 2008-517737 | A | 5/2008 | |
| JP | 2014-65003 | A | 4/2014 | |
| JP | 2014-521499 | A | 8/2014 | |
| JP | 2016-144794 | A | 8/2016 | |
| JP | 2018-69160 | A | 5/2018 | |
| JP | 2019-177342 | A | 10/2019 | |
| WO | WO 2010/120326 | A1 | 10/2010 | |
| WO | WO-2016136966 | A1 * | 9/2016 | ............. B01D 69/00 |

OTHER PUBLICATIONS

International Search Report, issued in PCT/JP2022/018638, PCT/ISA/210, dated Jul. 5, 2022.
Written Opinion of the International Searching Authority, issued in PCT/JP2022/018638, PCT/ISA/237, dated Jul. 5, 2022.
Chinese Office Action and Search Report for Chinese Application No. 202280030071.9, dated Jan. 31, 2024, with English translation.
Extended European Search Report for European Application No. 22791832.3, dated Aug. 20, 2024.
Qin et al., "Plasticizer-assisted interfacial polymerization for fabricating advanced reverse osmosis membranes," Journal of Membrane Science, vol. 619, 2021, pp. 1-11.

* cited by examiner

COMPOSITE SEMIPERMEABLE MEMBRANE

TECHNICAL FIELD

The present invention relates to a composite semipermeable membrane useful for selective separation of a liquid mixture. The composite semipermeable membrane obtained according to the present invention can be suitably used for desalination of, for example, seawater and brackish water.

BACKGROUND ART

There are various techniques for removing a substance (for example, salts) dissolved in a solvent (for example, water) in relation to separation of a mixture, and, in recent years, use of a membrane separation method as a process for energy and resource conservation has expanded. Membranes used in the membrane separation method include a microfiltration membrane, an ultrafiltration membrane, a nanofiltration membrane, a reverse osmosis membrane, and the like, and these membranes are used, for example, to obtain drinking water from seawater, brackish water, water containing a harmful substance, and the like, to produce ultrapure water for industrial use, to treat wastewater, or to recover a valuable material.

In particular, as a reverse osmosis membrane and a nanofiltration membrane, a composite semipermeable membrane containing a crosslinked polyamide as a separation active layer has been proposed. Methods for producing a composite semipermeable membrane containing a crosslinked polyamide as a separation active layer include a method of performing polymerization in the presence of an organic additive (Patent Literatures 1 and 2), a method of performing polymerization in the presence of a monofunctional acid halide (Patent Literature 3), and a method of performing polymerization in the presence of a partially hydrolyzed acid halide (Patent Literature 4).

CITATION LIST

Patent Literature

Patent Literature 1: JPH08-224452A
Patent Literature 2: JPH6-47260A
Patent Literature 3: JP2014-521499A
Patent Literature 4: WO2010/120326

SUMMARY OF INVENTION

Technical Problem

A composite semipermeable membrane in related art is generally used in a stacked manner, and a flow channel member is further inserted between membranes. Accordingly, abrasion occurs between the membrane and the flow channel member or another composite semipermeable membrane during use of the composite semipermeable membrane, performance of the membrane decreases, and therefore there is room for improvement in a membrane surface structure.

The present invention has been made in view of the above, and an object thereof is to provide a composite semipermeable membrane having excellent abrasion resistance and excellent water permeability even during high-pressure operation.

Solution to Problem

In order to achieve the above object, the present invention has the following configurations.

(1) A composite semipermeable membrane including:
   a support membrane; and
   a separation functional layer provided on the support membrane, in which
   the separation functional layer includes a thin membrane,
   the thin membrane has a fold structure including a plurality of protrusions having a height of 10 nm or more, and
   in the fold structure, a ratio (T100/T25) is less than 0.95, where T25 is a thickness of the thin membrane in a region of 0% to 25% of the height of the protrusion and T100 is a thickness of the thin membrane in a region of 50% to 100% of the height of the protrusion.

(2) The composite semipermeable membrane according to (1), in which
   the thickness T25 of the thin membrane in the region of 0% to 25% of the height of the protrusion is 13 nm or more and less than 24 nm.

(3) The composite semipermeable membrane according to (2), in which
   an actual length L of the thin membrane per 1 μm length of the support membrane in a cross-sectional direction perpendicular to a membrane surface is 3.0 μm or more.

(4) The composite semipermeable membrane according to (3), in which
   in the fold structure, a ratio of the number of the protrusions having the height of 200 nm or more to the number of the protrusions having the height of 10 nm or more is 1/20 or more and 1/2 or less.

(5) The composite semipermeable membrane according to (3) or (4), in which
   in the fold structure, a ratio of the number of the protrusions having the height of 400 nm or more to the number of the protrusions having the height of 10 nm or more is 1/20 or more and 1/5 or less.

Advantageous Effects of Invention

According to the present invention, it is possible to provide a membrane having excellent abrasion resistance and exhibiting excellent water permeability even during high-pressure operation.

DESCRIPTION OF EMBODIMENTS

Hereinafter, embodiments of the present invention will be described in detail, but the present invention is not limited in any way by these embodiments.

In the present description, "weight" and "mass", and "weight %" and "mass %" are used as synonyms.

A numerical range expressed using "to" means a range including numerical values described before and after "to" as a lower limit value and an upper limit value.

1. Composite Semipermeable Membrane

(1-1) Support Membrane

The support membrane substantially has no separation performance for ions or the like but imparts strength to a separation functional layer substantially having separation performance. A size and a distribution of pores in the support membrane are not particularly limited, and for example, it is preferable that the support membrane has uniform fine pores or fine pores gradually increasing in size from a surface on which the separation functional layer is formed to the other surface, and a size of each fine pore is 0.1 nm or more and 100 nm or less on the surface on which the separation functional layer is formed.

Figure 1:
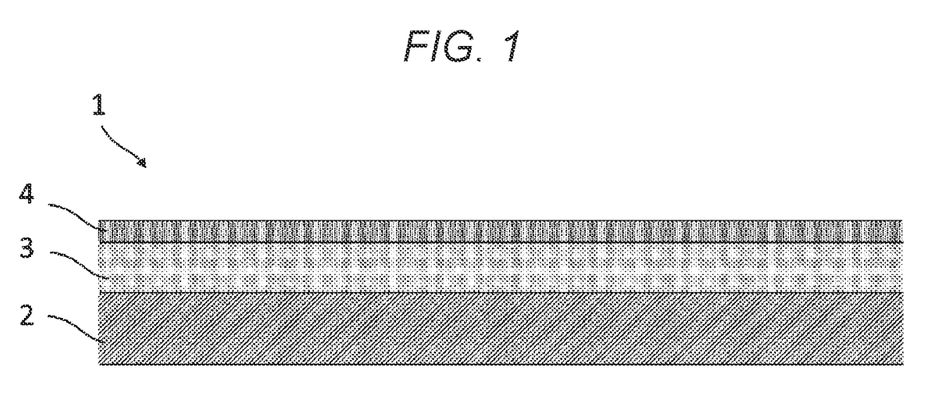
FIG. 1 is a cross-sectional view of a composite semipermeable membrane according to an embodiment of the present invention.

A material used for the support membrane and a shape thereof are not particularly limited, and for example, as shown in FIG. 1, the support membrane may be a composite membrane containing a base material 2 and a porous support layer 3 provided on the base material 2 or may be a membrane made of only one layer.

Examples of the base material include a fabric containing, as a main component, at least one selected from polyesters and aromatic polyamides. As the fabric, a long-fiber nonwoven fabric or a short-fiber nonwoven fabric can be preferably used.

A thickness of the base material is preferably in a range of 10 μm or more and 200 μm or less and more preferably in a range of 30 μm or more and 120 μm or less.

The porous support layer may contain, for example, at least one polymer selected from the group consisting of polysulfones, polyethersulfones, polyamides, polyesters, cellulosic polymers such as cellulose acetate and cellulose nitrate, vinyl polymers such as polyethylene, polypropylene, polyvinyl chloride, and polyacrylonitrile, homopolymers such as polyphenylene sulfide, polyphenylene sulfide sulfone, polyphenylene sulfone, and polyphenylene oxide, and copolymers thereof.

Among these polymers, as the porous support layer, polysulfones, cellulose acetate, polyvinyl chloride, or a mixture thereof is preferably used, and a polysulfone having high chemical, mechanical, and thermal stability is particularly preferably used.

A thickness of the porous support layer is preferably in a range of 10 to 200 μm and more preferably in a range of 20 to 100 μm. When the thickness of the porous support layer is 10 μm or more, favorable pressure resistance can be obtained, and a uniform support membrane having no defect can be obtained. A composite semipermeable membrane containing such a porous support layer can exhibit favorable salt removal performance. When the thickness of the porous support layer is 200 μm or less, an amount of unreacted substances remaining during production does not increase, and a decrease in chemical resistance caused by a decrease in an amount of permeated water can be prevented.

In order for the composite semipermeable membrane to obtain sufficient mechanical strength and a sufficient packing density, a thickness of the support membrane is preferably in a range of 30 to 300 μm and more preferably in a range of 50 to 250 μm.

A form of the support membrane can be observed with a scanning electron microscope, a transmission electron microscope, an interatomic microscope, or the like. For example, in order to observe the form of the support membrane with a scanning electron microscope, the porous support layer is peeled off from the base material, and then the base material is cut by a freeze-fracture method to obtain a sample for cross-sectional observation. The sample is thinly coated with, preferably, platinum, platinum-palladium, or ruthenium tetrachloride, more preferably ruthenium tetrachloride, and observed with an ultra-high-resolution field-emission scanning electron microscope (UHR-FE-SEM) at an acceleration voltage of 3 to 6 kV.

A thickness of each of the base material, the porous support layer, and the composite semipermeable membrane can be measured with a digital thickness gauge. In addition, since a thickness of the separation functional layer to be described later is much thinner than that of the support membrane, the thickness of the composite semipermeable membrane can be regarded as the thickness of the support membrane. Accordingly, the thickness of the porous support layer can be simply calculated by measuring the thickness of the composite semipermeable membrane with a digital thickness gauge and subtracting the thickness of the base material from the thickness of the composite semipermeable membrane. When using the digital thickness gauge, it is preferable to measure the thickness at 20 locations and calculate an average value.

The thickness of each of the base material, the porous support layer, and the composite semipermeable membrane may also be measured with the above-described microscope. The thickness is determined by measuring a thickness from an electron microscopic image of cross-sectional observation at five arbitrary locations of one sample and calculating an average value. A thickness and a pore diameter in the present embodiment each mean an average value.

(1-2) Separation Functional Layer

Figure 2:
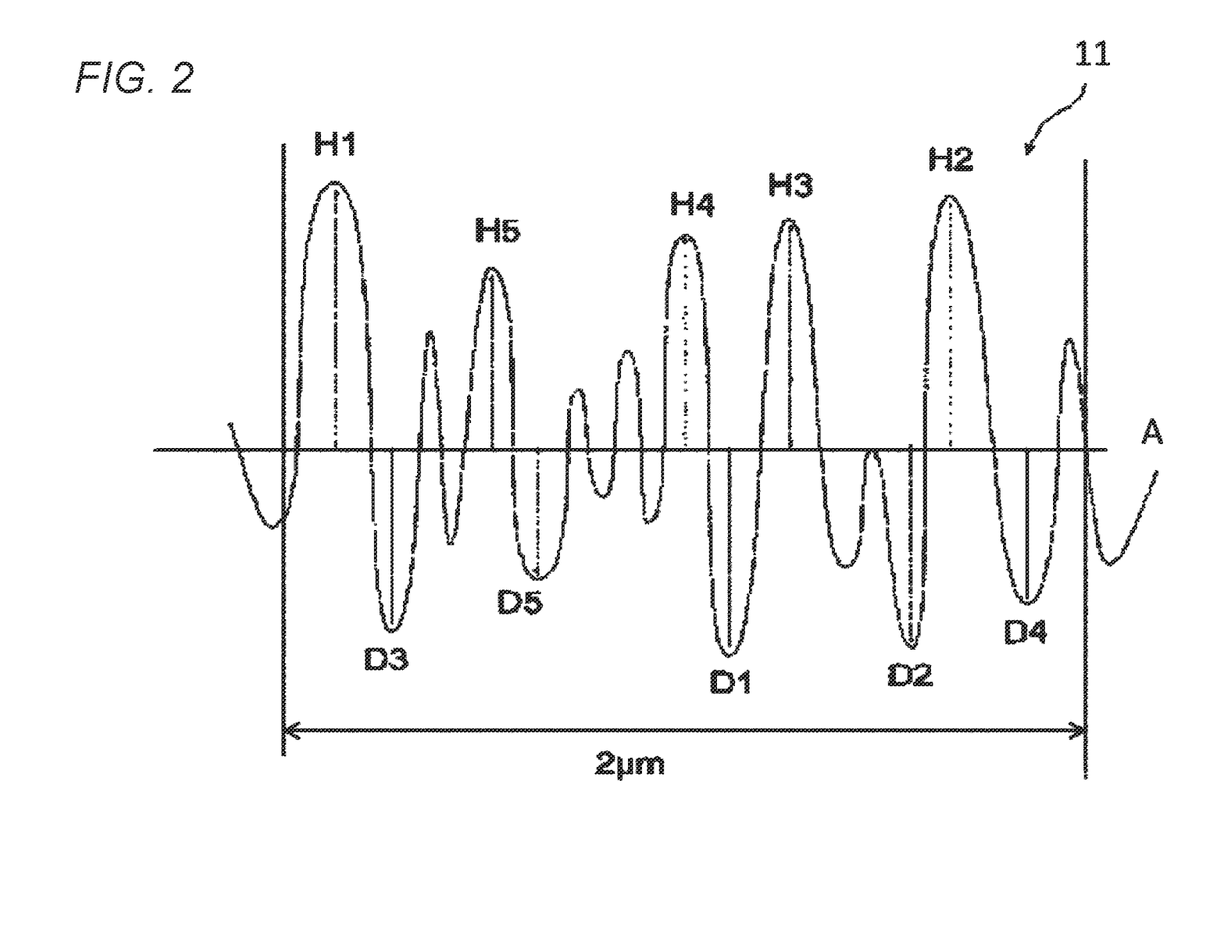
FIG. 2 is a cross-sectional view of a separation functional layer and is a schematic view showing a fold structure.

In the composite semipermeable membrane, the separation functional layer substantially has separation performance for ions or the like. In a cross-sectional view of a composite semipermeable membrane shown in FIG. 1, the separation functional layer is denoted by reference numeral "4". In the separation functional layer, as shown in FIG. 2, a thin membrane 11 forms a fold structure containing a plurality of protrusions.

The separation functional layer preferably contains a polyamide as a main component. In the case of the separation functional layer containing a polyamide as a main component, the polyamide can be formed by, for example, interfacial polycondensation between a polyfunctional amine and a polyfunctional acid halide. Here, it is preferable that at least one of the polyfunctional amine and the polyfunctional acid halide contains a trifunctional or higher functional compound.

In order to obtain sufficient separation performance and a sufficient amount of permeated water, the thickness of the separation functional layer is usually in a range of 0.01 to 1 μm and preferably in a range of 0.1 to 0.5 μm.

Here, the polyfunctional amine refers to an amine having at least two primary amino groups and/or secondary amino groups in one molecule in which at least one of the amino groups is a primary amino group. Examples of the polyfunctional amine include: aromatic polyfunctional amines such as phenylenediamine in which two amino groups are bonded to a benzene ring in an ortho-positional, a meta-positional, or a para-positional, xylylenediamine, 1,3,5-triaminobenzene, 1,2,4-triaminobenzene, 3,5-diaminobenzoic acid, 3-aminobenzylamine, and 4-aminobenzylamine; aliphatic amines such as ethylenediamine and propylenediamine; and alicyclic polyfunctional amines such as 1,2-diaminocyclohexane, 1,4-diaminocyclohexane, 4-aminopiperidine, and 4-aminoethylpiperazine.

Among these polyfunctional amines, in consideration of selective separation performance, permeability, and heat resistance of the membrane, an aromatic polyfunctional amine having 2 to 4 primary amino groups and/or secondary amino groups in one molecule is preferable. As such a polyfunctional aromatic amine, for example, m-phenylenediamine, p-phenylenediamine, and 1,3,5-triaminobenzene are preferably used. Among these polyfunctional aromatic amines, m-phenylenediamine (hereinafter referred to as m-PDA) is more preferably used in view of availability and ease of handling. These polyfunctional amines may be used alone or two or more amines may be used at the same time. When two or more amines are used at the same time, the amines described above may be used in combination, or an amine described above may be used in combination with an amine having at least two secondary amino groups in one molecule. Examples of the amine having at least two secondary amino groups in one molecule include piperazine and 1,3-bispiperidylpropane.

The polyfunctional acid halide refers to an acid halide having at least two halogenated carbonyl groups in one molecule. Examples of a trifunctional acid halide include: trimesic acid chloride; 1,3,5-cyclohexanetricarboxylic acid trichloride, and 1,2,4-cyclobutanetricarboxylic acid trichloride. Examples of a bifunctional acid halide include: aromatic bifunctional acid halides such as biphenyl dicarboxylic acid dichloride; azobenzene dicarboxylic acid dichloride, terephthalic acid chloride, isophthalic acid chloride, and naphthalene dicarboxylic acid chloride; aliphatic bifunctional acid halides such as adipoyl chloride and sebacoyl chloride; and alicyclic bifunctional acid halides such as cyclopentanedicarboxylic acid dichloride, cyclohexanedicarboxylic acid dichloride, and tetrahydrofurandicarboxylic acid dichloride.

In consideration of reactivity with the polyfunctional amine, the polyfunctional acid halide is preferably a polyfunctional acid chloride. In addition, in consideration of selective separation performance and heat resistance of the membrane, it is preferable to use a polyfunctional aromatic acid chloride having 2 to 4 carbonyl chloride groups in one molecule. Among them, trimesic acid chloride is more preferably used as the polyfunctional acid halide from the viewpoint of availability and ease of handling. These polyfunctional acid halides may be used alone or two or more thereof may be used at the same time.

In the separation functional layer, as shown in FIG. 2, the thin membrane has a fold structure including a plurality of concave portions and convex portions and has a plurality of protrusions having a height of 10 nm or more. Hereinafter, the term "convex portion" and the term "concave portion" refer to a relatively protruding portion and a relatively recessed portion of the thin membrane, and in particular, a portion above (in a direction away from the support membrane) a reference line A to be described later is referred to as a convex portion, and a portion below (on a side close to the support membrane) is referred to as a concave portion.

The term "protrusion" refers to a portion from a bottom of a concave portion to a bottom of an adjacent concave portion, that is, a portion from one convex portion to bottoms of two concave portions adjacent thereto. In the present description, a protrusion refers to a protrusion whose height is one-fifth or more of a ten-point average surface roughness of the thin membrane.

In the separation functional layer in the present embodiment, an actual length L of the thin membrane per 1 μm length of the support membrane in a cross-sectional direction perpendicular to a membrane surface is preferably 3.0 μm or more. When the actual length L of the thin membrane is 3.0 μm or more, the composite semipermeable membrane can obtain high water permeability. The actual length L of the thin membrane is more preferably 3.0 to 100 μm and still more preferably 3.0 to 10 μm.

In this description, the term "cross-sectional direction perpendicular to the membrane surface" means a direction straight along a direction perpendicular to the membrane surface.

The actual length L of the thin membrane can be obtained according to a general method for obtaining a surface area or a specific surface area, and the method is not particularly limited. For example, a method using an electron microscope such as a scanning electron microscope (SEM, FE-SEM) or a transmission electron microscope (TEM) can be adopted.

An example of a method of measuring the actual length L of the thin membrane using a transmission electron microscope (TEM) will be described. First, in order to prepare an ultrathin section for a TEM, a sample is embedded in a water-soluble polymer. Any water-soluble polymer may be used as long as the polymer can maintain a shape of the sample, and an example thereof is PVA.

Next, in order to facilitate cross-section observation, the sample is stained with $OsO_4$, and the stained sample is cut with an ultramicrotome to prepare an ultrathin section. A cross-sectional image of the obtained ultrathin section is captured using an electron microscope. An observation magnification may be appropriately determined based on the membrane thickness of the separation functional layer, and, in order to observe a cross-sectional shape of the separation functional layer and prevent the measurement from being localized, the observation magnification may be set to 50,000 to 100,000 times if the thickness of the separation functional layer is 10 to 100 nm.

Actual lengths of the thin membrane per 1 μm length of the support membrane in the cross-sectional direction perpendicular to the membrane surface are measured in cross sections at arbitrary 10 points each having a length of 2.0 μm in the cross-sectional image obtained above, and an additive average value thereof is calculated as the actual length L of the thin membrane of the composite semipermeable membrane.

The ten-point average surface roughness of the thin membrane is obtained by the following method.

A cross section in a direction perpendicular to the membrane surface is observed using an electron microscope. An observation magnification is preferably 10,000 to 100,000 times. In an obtained cross-sectional image, as shown in FIG. 2, a surface of the thin membrane (denoted by reference numeral "11" in FIG. 2) appears as a curve. For this curve, a roughness curve defined based on ISO 4287:1997 is obtained. Similarly, an average line of the roughness curve is obtained based on ISO 4287:1997. The average line is a straight line drawn such that total areas of regions surrounded by the average line and the roughness curve above and below the average line are equal.

As shown in FIG. 2, in an image having a length of 2.0 μm in a direction of the average line obtained above, the average line is set as the reference line A, and heights (distances from the reference line to vertices of convex portions) H1 to H5 from the reference line are measured for five convex portions from a highest convex portion to a fifth highest convex portion, and an average value thereof is calculated. In addition, depths (distances from the reference line to vertices of concave portions) D1 to D5 are measured for five concave portions from a deepest concave portion to a fifth deepest concave portion, and an average value thereof is calculated. A sum of the obtained two average values is the ten-point average surface roughness. A vertex refers to a point at which a distance from the reference line is maximum on the convex portion or the concave portion.

The height of the protrusion is calculated as follows. In a cross section having a length of 2.0 μm in the direction of the average line, for a protrusion that is one-fifth or more of the ten-point average surface roughness, a sum of an average d of depths (distances from the reference line to vertices of concave portions) d1 and d2 of two concave portions adjacent to the protrusion and a convex portion height h (a distance from the reference line to a vertex of a convex portion) is calculated as a protrusion height Ph.

In the composite semipermeable membrane according to the present embodiment, in cross sections at arbitrary ten points each having a length of 2.0 μm in the direction of the average line, it is preferable that a ratio (N/M) of the number N of protrusions having a height of 200 nm or more in the ten cross sections to the number M of protrusions having a height of 10 nm or more in the ten cross sections is 1/20 or more and 1/2 or less. When N/M is 1/20 or more, the composite semipermeable membrane can obtain high water permeability. N/M is more preferably 1/10 or more. In addition, when N/M is 1/2 or less, high water permeability can be obtained while a high removal rate is maintained. N/M is more preferably 1/3 or less.

The number of all protrusions in the ten cross sections means a sum obtained by obtaining the number of protrusions in each cross section for all the ten cross sections and summing up the numbers of protrusions obtained for each cross section over the ten cross sections.

In all the protrusions present in cross sections at arbitrary ten points each having a length of 20 μm in the direction of the average line, it is preferable that at least one protrusion having a height of 400 nm or more is present. In addition, it is more preferable that a ratio (N1/M) of the number N1 of protrusions having a height of 400 nm or more in the ten cross sections to the number M of protrusions having a height of 10 nm or more in the ten cross sections is 1/20 or more and 1/5 or less. When the protrusion having a height of 400 nm or more is present at the above range, high water permeability is obtained.

The height of the protrusion is preferably 70 nm or more and more preferably 90 nm or more. In addition, the height of the protrusion is preferably 1000 nm or less and more preferably 800 nm or less. When the height of the protrusions is 70 nm or more, a composite semipermeable membrane having sufficient water permeability can be easily obtained. In addition, when the height of the protrusion is 1000 nm or less, the protrusion is not crushed even when the composite semipermeable membrane is used under high-pressure operation, and thus stable membrane performance can be obtained.

The thickness of the thin membrane can be measured by a TEM. Preparation of an ultrathin section for the TEM is as described in the description of the measurement of the actual length L of the thin membrane. A cross section of the obtained ultrathin section is imaged by the TEM. An observation magnification may be appropriately determined depending on the thickness of the separation functional layer. The obtained cross-sectional image can be analyzed with image analysis software.

Figure 3:
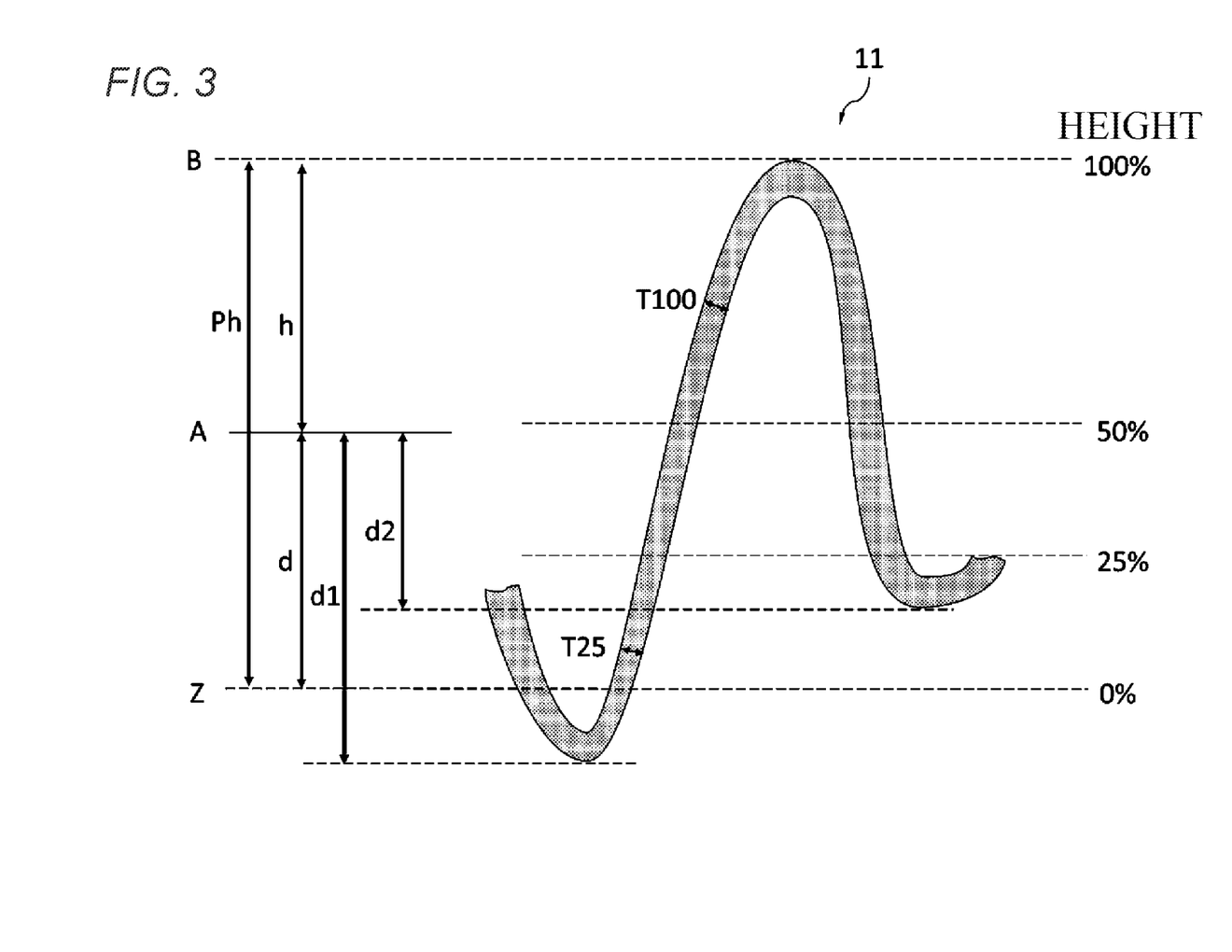
FIG. 3 is an enlarged cross-sectional view of a protrusion in the fold structure.

The thickness of the thin membrane in an upper portion and the thickness of the thin membrane in a lower portion of the protrusion in the fold structure are obtained as follows. As shown in FIG. 3, the average value d of the depths d1 and d2, from the reference line A to the vertices of the concave portions, of the two concave portions adjacent to the convex portion is calculated. Below the reference line A (on a side close to the support membrane), a position where a distance from the reference line A is d is defined as 0% height, the vertex of the convex portion is defined as 100% height, and the thickness of the thin membrane is measured at 10 locations in a region of 0% to 25% height and a region of 50% to 100% height respectively. The same measurement is performed for five protrusions. For values of the thin membrane thickness at 50 points in the region of 0% to 25% height, an additive average value is calculated. This value is defined as a lower portion thickness T25 of the thin membrane of the composite semipermeable membrane. With respect to the thickness of the thin membrane in the region of 50% to 100% height, an additive average value is calculated in the same manner and defined as an upper portion thickness T100 of the thin membrane.

The lower portion thickness T25 is preferably 13 nm or more and less than 24 nm. When the lower portion thickness T25 is 13 nm or more, the fold structure can be maintained even when the composite semipermeable membrane is used under high-pressure operation, and thus water permeability and a salt removal rate can be maintained. T25 is more preferably 14 nm or more and still more preferably 16 nm or more. In addition, when T25 is less than 24 nm, sufficient water permeability can be maintained while securing a high salt removal rate. T25 is more preferably 23 nm or less and still more preferably 21 nm or less.

In the fold structure in the present embodiment, a ratio (T100/T25) of the upper portion thickness T100 to the lower portion thickness T25 is less than 0.95. T100/T25 is preferably 0.92 or less, more preferably 0.90 or less, and still more preferably 0.87 or less. In addition, T100/T25 is preferably 0.70 or more, more preferably 0.72 or more, and still more preferably 0.75 or more.

The composite semipermeable membrane is generally used in a stacked manner, and for example, a flow channel member is inserted between the composite semipermeable membranes. When T100/T25 is in the above range, the upper portion of the protrusion is relatively thinner and more flexible than the lower portion and the lower portion is thicker and stronger than the upper portion. Therefore, even when the protrusion is abraded against the flow channel member or another composite semipermeable membrane during use of the composite semipermeable membrane, a force field is distributed to the lower portion and thus damage is reduced.

In particular, when T100/T25 is less than 0.95 and T25 is preferably 13 nm or more, even when the protrusion of the thin membrane is abraded against the flow channel member or another composite semipermeable membrane during use of the composite semipermeable membrane, the lower portion of the protrusion can be further prevented from being damaged and the fold structure can be further prevented from collapsing.

2. Production Method

An example of a method for producing the composite semipermeable membrane according to the present embodiment described above is shown below.

(2-1) Formation of Separation Functional Layer

A process of forming the separation functional layer on the support membrane will be described. Hereinafter, a case where the support membrane contains the base material and the porous support layer will be described as an example. When the support membrane does not contain the base material, "surface of the porous support layer" and "on the porous support layer" may be read as "surface of the support membrane" and "on the support membrane", respectively.

The process of forming the separation functional layer includes a step of bringing a polyfunctional amine solution into contact with a polyfunctional acid halide solution on the porous support layer to form a polyamide by an interfacial polycondensation reaction. More specifically, the process of forming the separation functional layer includes:

(i) bringing the porous support layer into contact with the polyfunctional amine solution; and (ii) bringing an organic solvent solution containing the polyfunctional acid halide into contact with the porous support layer after (i) to produce the polyamide on the porous support layer by interfacial polycondensation.

Hereinafter, each production process will be described in detail.

The polyfunctional amine solution is an aqueous solution, a concentration of a polyfunctional amine in the solution is preferably in a range of 0.1 to 20 weight % and more preferably in a range of 0.5 to 15 weight %. When the concentration of the polyfunctional amine is in this range, a composite semipermeable membrane having sufficient salt removal performance and water permeability can be obtained.

The polyfunctional amine aqueous solution may contain a surfactant, an organic solvent, an alkaline compound, an antioxidant, and the like as long as the reaction between the polyfunctional amine and the polyfunctional acid halide is not hindered.

Examples of the surfactant include compounds having a polyoxyalkylene structure, a fatty acid ester structure, or a hydroxy group, and examples of the polyoxyalkylene structure include $-(CH_2CH_2O)_n-$, $-(CH_2CH(CH_3)O)_n-$, $-(CH_2CH_2CH_2O)_n-$, and $-(CH_2CH_2CH_2CH_2O)_n-$. Examples of the fatty acid ester structure include fatty acids having a long-chain aliphatic group. The long-chain aliphatic group may be linear or branched, and examples of the fatty acid include stearic acid, oleic acid, lauric acid, palmitic acid, and salts thereof. In addition, examples of the fatty acid includes a fatty acid ester derived from oils and fats, such as beef tallow, palm oil, and coconut oil. Examples of a surfactant having a sulfo group include 1-hexane sulfonic acid, 1-octane sulfonic acid, 1-decane sulfonic acid, 1-dodecane sulfonic acid, perfluorobutane sulfonic acid, toluene sulfonic acid, cumene sulfonic acid, and octylbenzene sulfonic acid. Examples of the surfactant having a hydroxy group include ethylene glycol, propylene glycol, 2-propanediol, 1,4-butanediol, glycerin, sorbitol, glucose, and sucrose. The surfactant has an effect of improving wettability of the surface of the porous support layer and reducing interfacial tension between an amine aqueous solution and a nonpolar solvent.

Examples of the organic solvent include a chain amide compound and a cyclic amide compound. Examples of the chain amide compound include N-methylformamide, N,N-dimethylformamide, N,N,-dimethylacetamide, N,N-diethylformamide, and N,N-diethylacetamide. Examples of the cyclic amide compound include N-methylpyrrolidinone, γ-butyrolactam, and ε-caprolactam. The organic solvent may act as a catalyst for the interfacial polycondensation reaction, and the interfacial polycondensation reaction may efficiently be performed due to addition of the organic solvent.

Examples of the alkaline compound include: alkali metal hydroxides such as sodium hydroxide and potassium hydroxide; inorganic carbonate compounds and inorganic hydrogen carbonate compounds such as sodium carbonate, sodium hydrogen carbonate, potassium carbonate, and potassium hydrogen carbonate; and organic compounds such as tetramethylammonium hydroxide and tetraethylammonium hydroxide.

Examples of the antioxidant include a phenol-based antioxidant, an amine-based antioxidant, a sulfur-based antioxidant, and a phosphorus-based antioxidant. Examples of the phenol-based antioxidant (including a hindered phenol-based antioxidant) include 2,6-di-tert-butyl-4-methylphenol, 2,2'-methylene bis(4-ethyl-6-tert-butylphenol), and tetrakis-[methylene-3-(3',5'-di-tert-butyl-4'-hydroxyphenyl)propionate]methane. Examples of the amine-based antioxidant include phenyl-β-naphthylamine, α-naphthylamine, N,N'-di-sec-butyl-p-phenylenediamine, phenothiazine, and N,N'-diphenyl-p-phenylenediamine.

Examples of the sulfur-based antioxidant include dilauryl 3,3'-thiodipropionate, distearyl thiodipropionate, lauryl stearyl thiodipropionate, and dimyristyl 3,3'-thiodipropionate. Examples of the phosphorus-based antioxidant include triphenyl phosphite, octadecyl phosphite, and trinonylphenyl phosphite. Examples of other antioxidants include: ascorbic acid or an alkali metal salt thereof; steric hindrance phenol compounds such as dibutylhydroxytoluene and butylhydroxyanisole; isopropyl citrate; dl-α-tocopherol; nordihydroguaiaretic acid; and propyl gallate.

Contact between the polyfunctional amine aqueous solution and the porous support layer is preferably performed uniformly and continuously on the surface of the porous support layer. Specific examples include a method of applying the polyfunctional amine aqueous solution to the porous support layer and a method of immersing the porous support layer in the polyfunctional amine aqueous solution. A time of contact between the porous support layer and the polyfunctional amine aqueous solution is preferably in a range of 1 to 10 minutes and more preferably in a range of 1 to 3 minutes.

After the polyfunctional amine aqueous solution is brought into contact with the porous support layer, it is preferable to sufficiently remove liquid such that no droplet remains on the membrane. By sufficiently removing liquid, it is possible to prevent droplet residue from becoming a membrane defect after membrane formation and deteriorating membrane performance. As a liquid removal method, for example, as disclosed in JPH2-78428A, a method of holding the support membrane in a vertical direction after the contact with the polyfunctional amine aqueous solution and allowing the excessive aqueous solution to naturally flow down, a method of forcibly removing liquid by blowing an air flow such as nitrogen from an air nozzle, or the like can be used. In addition, after the liquid removal, the membrane surface can be dried to partially remove water of the aqueous solution.

Step (ii) will be described. Step (ii) is a step of bringing a polyfunctional acid halide or an organic solvent solution containing a polyfunctional acid halide into contact with the porous support layer to produce a polyamide on the porous support layer by interfacial polycondensation.

In step (ii), a layer of the polyfunctional acid halide solution is formed on the layer of the amine aqueous solution on the porous support layer formed in step (i). Examples of the method for bringing the polyfunctional acid halide solution into contact with the porous support layer include application and dripping. Hereinafter, the term "application" includes other contact methods unless otherwise specified.

A concentration of the polyfunctional acid halide in the organic solvent solution is preferably in a range of 0.01 to 10 weight % and more preferably in a range of 0.02 to 2.0 weight %. When the concentration of the polyfunctional acid halide is 0.01 weight % or more, a sufficient reaction rate can be obtained. In addition, when the concentration is 10 weight % or less, occurrence of a side reaction can be inhibited.

It is preferable that the organic solvent is immiscible with water, dissolves the polyfunctional acid halide, and does not damage the support membrane. The organic solvent is inert to polyfunctional amine compounds and polyfunctional acid halides. Preferable examples of the organic solvent include hydrocarbon compounds such as n-hexane, n-octane, n-nonane, n-decane, n-undecane, n-dodecane, isodecane, and isododecane.

The polyfunctional acid halide solution preferably further contains water. In addition, in the layer of the polyfunctional acid halide solution formed on the layer of the amine aqueous solution on the porous support layer, it is preferable to provide a concentration gradient in which a water content decreases as the porous support layer is closer. When the polyfunctional acid halide solution contains water and the water content in the layer of the polyfunctional acid halide solution has the above-described gradient, the upper portion thickness and the lower portion thickness of the thin membrane in the fold structure can be changed. As a result, abrasion resistance of the composite semipermeable membrane can be improved, and a composite semipermeable membrane having both abrasion resistance and water permeability can be obtained.

A method for forming the concentration gradient in the water content in the layer of the polyfunctional acid halide solution is not limited to a specific form, and for example, a polyfunctional acid halide solution having a low water content (first polyfunctional acid halide solution) may be applied to the porous support layer firstly, and then a polyfunctional acid halide solution having a high water content (second polyfunctional acid halide solution) may be applied.

The water content in the first polyfunctional acid halide solution is preferably 500 ppm or less. When the water content in the first polyfunctional acid halide solution is 500 ppm or less, reactivity with an amine is improved, and the lower portion thickness of the thin membrane can be increased. The water content in the first polyfunctional acid halide solution is more preferably 200 ppm or less and still more preferably 150 ppm or less. In addition, the water content in the first polyfunctional acid halide solution is preferably more than 0 ppm, more preferably 5 ppm or more, and still more preferably 40 ppm or more.

The water content in the second polyfunctional acid halide solution is preferably more than the water content in the first polyfunctional acid halide solution and is 500 ppm or less, more preferably 300 ppm or less, and still more preferably 150 ppm or less. In addition, the water content in the second polyfunctional acid halide solution is preferably larger than the water content in the first polyfunctional acid halide solution and is 0 ppm or more, more preferably 20 ppm or more, and still more preferably 40 ppm or more.

The number of times the polyfunctional acid halide solution is applied to the porous support layer is preferably 2 to 6 times and more preferably 2 times.

The polyfunctional acid halide solution more preferably contains a compound represented by the following chemical formula (I) (hereinafter referred to as a compound (I)).

[Chem. 1]

Compound (I)

In the above formula, $R_1$ and $R_2$ each independently represent an alkyl group having 1 or more carbon atoms.

The compound (I) is preferably an aromatic ester and particularly preferably a phthalate ester. Specific examples of the phthalate ester include dibutyl phthalate, dibutyl benzyl phthalate, diethyl hexyl phthalate, diisodecyl phthalate, diisononyl phthalate, dioctyl phthalate, diisobutyl phthalate, diethyl phthalate, dimethyl phthalate, diisooctyl phthalate, dipropyl phthalate, dicyclohexyl phthalate, dinonyl phthalate, dibenzyl phthalate, dihexyl phthalate, dibenzyl phthalate, diphenyl phthalate, and bis(2-ethylhexyl) phthalate.

When the polyfunctional acid halide solution contains the compound (I), it is possible to increase the actual length of the thin membrane in the separation functional layer, increase the thickness of the thin membrane, and both water permeability and salt removal performance of the composite semipermeable membrane can be achieved.

Although detail of an action of the compound (I) is not clear, it is considered that when the amine diffuses from the polyfunctional amine aqueous solution to the organic solvent containing the polyfunctional acid halide during the interfacial polycondensation between the polyfunctional amine and the polyfunctional acid halide, a concentration gradient of the amine is gentle due to the presence of the compound (I), and as a result, a formation time of the protrusion of the separation functional layer is sufficiently long, a structure formation of the protrusion easily proceeds, and a protrusion surface area and a thickness are both increased.

Further, when the separation functional layer is formed, the polyfunctional acid halide solution to which the compound (I) is added preferably further contains water. Accordingly, it is considered that the concentration gradient varies from the amine aqueous solution to the polyfunctional acid halide solution in the membrane surface direction, and thus the height of the protrusion and an angle of the protrusion are also changed.

A concentration of the compound (I) in the polyfunctional acid halide solution can be changed depending on a type of the compound (I) to be added and is preferably in a range of 5 ppm to 500 ppm. In addition, it is also preferable to add water of 10 ppm or more to the polyfunctional acid halide solution.

The polyfunctional acid halide solution may further contain, as an additive, a monofunctional acid halide, trimesic acid chloride in which one acid chloride group is hydrolyzed (hereinafter referred to as monohydrolyzed TMC), or trimesic acid chloride in which two acid chloride groups are hydrolyzed (hereinafter referred to as dihydrolyzed TMC).

Examples of the monofunctional acid halide include at least one compound selected from the group consisting of benzoyl fluoride, benzoyl chloride, benzoyl bromide, methanoyl fluoride, methanoyl chloride, methanoyl bromide, ethanoyl fluoride, ethanoyl chloride, ethanoyl bromide, propanoyl fluoride, propanoyl chloride, propanoyl bromide, propenoyl fluoride, propenoyl chloride, propenoyl bromide, butanoyl fluoride, butanoyl chloride, butanoyl bromide, butenoyl fluoride, butanoyl chloride, and butenoyl bromide.

A temperature of the membrane surface immediately after the polyfunctional amine aqueous solution is brought into contact with the polyfunctional acid halide solution is preferably in a range of 25° C. to 60° C. and more preferably in a range of 30° C. to 50° C. By setting the temperature of the membrane surface to 25° C. or more, the fold structure in the separation functional layer is enlarged, and a permeation flux increases. In addition, by setting the temperature of the membrane surface to 60° C. or less, a composite semipermeable membrane having a high removal rate can be obtained.

As a method for imparting the temperature to the membrane surface, the support membrane may be heated, or a heated organic solvent solution of the polyfunctional acid halide may be brought into contact. The temperature of the membrane surface immediately after the polyfunctional amine aqueous solution is brought into contact with the polyfunctional acid halide solution can be measured with a non-contact thermometer such as a radiation thermometer.

As described above, after the separation functional layer containing the crosslinked polyamide is formed on the porous support layer by bringing the organic solvent solution of the polyfunctional acid halide into contact to perform interfacial polycondensation, the excessive solvent may be removed. As a method for liquid removal, for example, it is possible to use a method of holding the membrane in a vertical direction and removing the excessive organic solvent by naturally flowing down. In this case, a time of holding in the vertical direction is preferably 1 to 5 minutes and more preferably 1 to 3 minutes. When the time is 1 minute or more, a sufficient amount of the polyamide can be formed as the separation functional layer, and when the time is 5 minutes or less, the organic solvent is not excessively evaporated, and thus occurrence of defects of the membrane can be inhibited.

(2-2) Formation of Support Membrane

As the support membrane, a commercially available filter can be applied. In addition, the support membrane containing the base material and the porous support layer may be formed by applying a polymer solution onto the base material and then coagulating the polymer, or the support membrane may be formed by applying the polymer solution onto a substrate such as glass, then coagulating the polymer solution, and peeling the polymer from the substrate.

For example, in the case of forming the support membrane using a polysulfone, the polysulfone is dissolved in N,N-dimethylformamide (hereinafter, referred to as DMF) to obtain a polymer solution, and the solution is applied onto the base material to a predetermined thickness, followed by wet-coagulation in water. According to this method, the porous support layer in which most of the surface thereof have fine pores each having a diameter of several 10 nm or less can be obtained.

(2-3) Other Treatment

Salt removal performance and water permeability of the composite semipermeable membrane after the formation of the separation functional layer can be improved by adding a process of performing a hot water treatment at preferably 50 to 150° C. more preferably 70 to 130° C. for preferably 1 second to 10 minutes and more preferably 1 minute to 8 minutes.

The salt removal rate of the composite semipermeable membrane can be further improved by including a process of bringing into contact with a compound (A) reactive with the primary amino group in the separation functional layer after the hot water treatment to form a diazonium salt or a derivative thereof and then bringing into contact with a water-soluble compound (B) reactive with the compound (A).

Examples of the compound (A) reactive with the primary amino group to form the diazonium salt or the derivative thereof include aqueous solutions of nitrous acid, salts thereof, and nitrosyl compounds. Since an aqueous solution of nitrous acid or a nitrosyl compound generates a gas and is easily decomposed, for example, it is preferable to sequentially produce nitrous acid by a reaction between a nitrite and an acidic solution. In general, a nitrite reacts with hydrogen ions to generate nitrous acid ($HNO_2$), and generation can efficiently proceed when pH of an aqueous solution is preferably 7 or less, more preferably 5 or less, and still more preferably 4 or less. Among them, an aqueous solution of sodium nitrite obtained by a reaction with hydrochloric acid or sulfuric acid in an aqueous solution is particularly preferable in view of ease of handling.

For example, when the compound (A) reactive with the primary amino group to form the diazonium salt or the derivative thereof is sodium nitrite, a concentration of sodium nitrite is preferably in a range of 0.01 to 1 weight %. When the concentration of sodium nitrite is within the above range, an effect of sufficiently generating the diazonium salt or the derivative thereof is obtained, and the solution is easily handled.

A temperature of the compound is preferably 15° C. to 45° C. When the temperature of the compound is in the above range, the reaction is not excessively time-consuming, decomposition of nitrous acid is not excessively fast, and thus handling is easy.

A time of contact between the primary amino group and the compound is a time during which the diazonium salt and/or the derivative thereof is generated, the treatment can be performed in a short time when the concentration is high, and a long time is required when the concentration is low. Therefore, according to the solution having the above concentration, the time is preferably within 10 minutes and more preferably within 3 minutes.

A method for bringing the primary amino group into contact with the compound is not particularly limited, a solution of the compound may be applied (coated), or the composite semipermeable membrane may be immersed in the solution of the compound. Any solvent may be used as a solvent for dissolving the compound as long as the compound is dissolved and the composite semipermeable membrane is not eroded. In addition, the solution of the compound may contain a surfactant, an acidic compound, an alkaline compound, or the like as long as the reaction between the primary amino group and the reagent is not hindered.

Next, the composite semipermeable membrane in which the diazonium salt or the derivative thereof is formed is brought into contact with the water-soluble compound (B) reactive with the diazonium salt or the derivative thereof. Here, examples of the water-soluble compound (B) reactive with the diazonium salt or the derivative thereof include chloride ions, bromide ions, cyanide ions, iodide ions, boron fluoride, hypophosphorous acid, sodium hydrogen sulfite, sulfite ions, aromatic amines, phenols, hydrogen sulfide, and thiocyanic acid.

When reacted with sodium hydrogen sulfite and sulfite ions, a substitution reaction occurs instantaneously, and an amino group is substituted with a sulfo group. In addition, contact with aromatic amines or phenols may cause a diazo coupling reaction and introduce an aromatic to the membrane surface. These compounds may be used alone, or a plurality thereof may be used in combination, or the membrane may be brought into contact with different compounds a plurality of times. The compound to be brought into contact is preferably sodium hydrogen sulfite and sulfite ions.

A concentration at which and a time during which the water-soluble compound (B) reactive with the diazonium salt or the derivative thereof is in contact with the composite semipermeable membrane in which diazonium salt or the derivative thereof is formed may be appropriately adjusted to obtain a desired effect.

A temperature at which the water-soluble compound (B) reactive with the diazonium salt or the derivative thereof is brought into contact with the composite semipermeable membrane in which the diazonium salt or the derivative thereof is formed is preferably 10° C. to 90° C. In this temperature range, the reaction easily proceeds whereas a decrease in the amount of permeated water caused by shrinkage of the polymer does not occur.

The membranes before and after the treatment in (2-3) are each referred to as the "composite semipermeable membrane", and the layers on the support membranes of the membranes before and after the treatment in (2-3) are each referred to as the "separation functional layer".

(3) Use of Composite Separation Membrane

The composite semipermeable membrane according to the present embodiment produced in this way is suitably used as a spiral-type composite semipermeable membrane element obtained by winding, around a cylindrical water collection tube provided with a large number of holes, the composite semipermeable membrane together with a raw water flow channel member such as a plastic net, a permeated water flow channel member such as tricot, and a film for increasing pressure resistance if necessary. Further, the composite semipermeable membrane can also be used in a composite semipermeable membrane module in which such elements are connected in series or parallel and accommodated in a pressure vessel.

The composite semipermeable membrane, the element thereof, and the module thereof, in combination with a pump for supplying raw water thereto, a device for pretreating the raw water, and the like, can compose a fluid separation device. By using this separation device, raw water can be separated into permeated water such as drinking water and concentrated water that does not permeate through the composite semipermeable membrane to obtain intended water.

As operating pressure of the fluid separation device increases, the salt removal rate increases and energy required for operation also increases. In addition, in consideration of durability of the composite semipermeable membrane, the operating pressure when water to be treated permeates the composite semipermeable membrane is preferably 0.5 MPa or more and 10 MPa or less.

A temperature of supplied water is preferably 5° C. or higher and 45° C. or lower since the salt removal rate decreases as the temperature increases and a membrane permeation flux decreases as the temperature decreases. In addition, when pH of the supplied water is high, in a case where the supplied water has a high salt concentration, such as seawater, there is a concern that scale of magnesium or the like is generated, and there is also a concern that the membrane deteriorates due to operation with high pH. Therefore, operation in a neutral range of pH is preferable.

Examples of the raw water to be treated by the composite semipermeable membrane according to the present embodiment include liquid mixtures containing salt (total dissolved solids) of 50 mg/L to 100 g/L, such as seawater, brackish water, or wastewater. In general, the salt refers to an amount of total dissolved solids and is represented by "mass÷volume" or a "weight ratio". According to the definition, the total dissolved solids can be calculated from a weight of residue obtained by evaporating, at a temperature of 39.5 to 40.5° C., a solution filtered through a filter of 0.45 μm and is more conveniently converted from practical salinity (S).

EXAMPLES

Hereinafter, the present invention will be described in more detail with reference to Examples, but the present invention is not limited to these Examples.

Measurements of Examples and Comparative Examples were performed as follows.

(Parameter Measurement of Thin Membrane)

A composite semipermeable membrane was embedded in polyvinyl alcohol (PVA) and stained with $OsO_4$, followed by cutting with an ultramicrotome to prepare an ultrathin section. A cross-sectional image of the obtained ultrathin section was taken using a transmission electron microscope. The cross-sectional image taken by the transmission electron microscope was taken into image analysis software Image J. An actual length of a thin membrane, a thin membrane thickness of a protrusion, and a height (existence ratio) of the protrusion were measured by the above-described methods.

(Water Content in Polyfunctional Acid Halide Solution)

A water content in a polyfunctional acid halide solution was measured five times using a trace moisture measuring device CA-05 manufactured by Mitsubishi Chemical Corporation, and an average value was obtained.

(Abrasion Resistance Test of Membrane)

An 18 cm×16 cm net (thickness: 550 μm, pitch: 2.1 mm×2.1 mm, fiber diameter: 0.28 mm), an 18 cm×16 cm acrylic plate, and a 3 kg weight were sequentially placed on a surface of a separation functional layer of the composite semipermeable membrane cut into an A3 size. A metal rod was attached to an end surface of the net, and the metal rod was pulled at 0.5 cm/sec to abrade the composite semipermeable membrane and the net. NaCl transmittances of the composite semipermeable membrane before and after the abrasion and a membrane permeation flux after the abrasion were measured by the following methods, and a NaCl transmittance ratio was calculated. Results of the NaCl transmittance ratio are shown as "SP ratio" in Table 1.

(Evaluation of Membrane Performance Under High Pressure)

(NaCl Transmittance)

Evaluation raw water (having a NaCl concentration of 3.2% and a boron concentration of about 5 ppm) adjusted to have a temperature of 25° C. and pH of 6.5 was supplied to the composite semipermeable membrane under operating pressure of 5.5 MPa to perform a membrane filtration treatment for 24 hours. Thereafter, electrical conductivity of each of supplied water and permeated water was measured with an electrical conductometer manufactured by Toa Electronics, Ltd. to obtain a NaCl concentration, respectively.

NaCl Transmittance (%)=100×(NaCl Concentration in Permeated Water/NaCl Concentration in Supplied Water)

(Membrane Permeation Flux)

In the tests described above, an amount of the permeated supplied water (evaluation raw water) was represented by an amount (cubic meter) of permeated water per day per square meter of a membrane surface as a membrane permeation flux ($m^3/m^2/day$).

Reference Example 1

An 18 weight % DMF solution of a polysulfone was cast at a room temperature (25° C.) to a thickness of 200 μm on a polyester nonwoven fabric formed of long fibers, followed by immediate immersion in pure water and standing for 5 minutes to prepare a support membrane.

Example 1

The support membrane obtained in Reference Example 1 was immersed in an aqueous solution containing 4 weight % of m-phenylenediamine (m-PDA) for 2 minutes, and the support membrane was slowly pulled up in a vertical direction. After nitrogen was blown from an air nozzle to remove the excessive aqueous solution from a surface of the support membrane, as the first and second polyfunctional acid halide solutions, n-decane solutions containing 0.12 weight % of trimesic acid chloride (TMC) were applied to the support membrane sequentially. Water contents in the first and second polyfunctional acid halide solutions are as shown in Table 1.

Next, after being heated in an oven at 100° C., in order to remove the excessive solution from the membrane, the membrane was set vertically, subjected to liquid removal, and dried by blowing air at 20° C. using a blower. Finally, the membrane was washed with pure water at 90° C. to obtain a composite semipermeable membrane. Production conditions are shown in Table 1, and an actual length of a thin membrane, a thickness of the thin membrane (T25 and T100/T25), a height of a protrusion (existence ratio), and membrane performance of the obtained composite semipermeable membrane are shown in Table 2.

Examples 2 to 17

Composite semipermeable membranes were obtained in the same manner as the method in Example 1 except that presence or absence of dioctyl phthalate and the water contents in the first and second polyfunctional acid halide solutions were changed to concentrations shown in Table 1. Concentrations of dioctyl phthalate additives in the first and second polyfunctional acid halide solutions are as shown in Table 1.

Comparative Examples 1 to 3

Composite semipermeable membranes were obtained in the same manner as the method in Example 1 except that only the first polyfunctional acid halide solution was applied to the support membrane. The water content in the first polyfunctional acid halide solution is as shown in Table 1.

Comparative Examples 4 and 5

Composite semipermeable membranes were obtained in the same manner as the method in Example 1 except that the water contents in the first and second polyfunctional acid halide solutions were changed to concentrations shown in Table 1.

Comparative Example 6

The polyester nonwoven fabric same as in Reference Example 1 was used as a base material. A first polysulfone solution (14.0 weight % DMF solution) and a second polysulfone solution (17.0 weight % DMF solution) were prepared.

The first polysulfone solution and the second polysulfone solution were simultaneously discharged using a double slit die coater, the first polysulfone solution was cast on the base material and the second polysulfone solution was cast on the first polysulfone solution. The first polysulfone solution was cast to a thickness of 180 μm and the second polysulfone solution was cast to a thickness of 20 μm, followed by immediate immersion in pure water and standing for 5 minutes to prepare the support membrane.

After a 2.8 weight % aqueous solution of m-PDA was applied to the support membrane obtained above and standing for 2 minutes, nitrogen was blown from an air nozzle to remove the excessive aqueous solution from a surface of the support membrane. Subsequently, an n-decane solution containing 0.10 weight % of trimesic acid chloride as the first polyfunctional acid halide solution was applied onto the support membrane such that the surface was completely wet, followed by standing for 10 seconds, and then the membrane was held vertically for 1 minute and subjected to liquid removal to remove the excessive solution from the membrane. The membrane thus obtained was washed with hot water at 90° C. for 2 minutes to obtain a composite semipermeable membrane. The water content in the first polyfunctional acid halide solution is as shown in Table 1.

TABLE 1

| | Water Content in First Polyfunctional Acid Halide Solution ppm | Water Content in Second Polyfunctional Acid Halide Solution ppm | Additive | Additive Concentration ppm |
|---|---|---|---|---|
| Example 1 | <5 | 30 | — | — |
| Example 2 | <5 | 52 | — | — |
| Example 3 | 11 | 49 | — | — |
| Example 4 | 25 | 78 | — | — |
| Example 5 | 48 | 71 | — | — |
| Example 6 | 75 | 100 | — | — |
| Example 7 | 102 | 151 | — | — |
| Example 8 | 173 | 226 | — | — |
| Example 9 | 174 | 201 | — | — |
| Example 10 | 25 | 101 | Dioctyl Phthalate | 5 |
| Example 11 | 49 | 101 | Dioctyl Phthalate | 5 |
| Example 12 | 75 | 102 | Dioctyl Phthalate | 5 |
| Example 13 | 101 | 150 | Dioctyl Phthalate | 5 |
| Example 14 | 11 | 40 | Dioctyl Phthalate | 220 |
| Example 15 | 11 | 41 | Dioctyl Phthalate | 350 |
| Example 16 | 101 | 150 | Dioctyl Phthalate | 220 |
| Example 17 | 101 | 151 | Dioctyl Phthalate | 350 |
| Comparative Example 1 | 171 | — | — | — |
| Comparative Example 2 | <5 | — | — | — |
| Comparative Example 3 | 48 | — | — | — |
| Comparative Example 4 | 100 | 99 | — | — |

TABLE 1-continued

|  | Water Content in First Polyfunctional Acid Halide Solution ppm | Water Content in Second Polyfunctional Acid Halide Solution ppm | Additive | Additive Concentration ppm |
|---|---|---|---|---|
| Comparative Example 5 | <5 | <5 | — | — |
| Comparative Example 6 | <5 | — | — | — |

TABLE 2

|  | Thickness of Thin Membrane | | Actual Length of Thin Membrane (per 1 μm membrane) μm | Height of Protrusion (Existence Ratio) | | | Performance after Abrasion | |
|---|---|---|---|---|---|---|---|---|
|  | T100/T25 | T25 nm |  | 10 nm or more and less than 200 nm | 200 nm or more and less than 400 nm % | 400 nm or more | Membrane Permeation Flux m³/m²/day | SP Ratio |
| Example 1 | 0.92 | 16 | 2.5 | 100 | 0 | 0 | 0.89 | 1.6 |
| Example 2 | 0.93 | 17 | 2.5 | 100 | 0 | 0 | 0.90 | 1.6 |
| Example 3 | 0.90 | 15 | 2.6 | 100 | 0 | 0 | 0.93 | 1.5 |
| Example 4 | 0.91 | 16 | 2.6 | 100 | 0 | 0 | 0.92 | 1.5 |
| Example 5 | 0.91 | 16 | 3.3 | 100 | 0 | 0 | 1.15 | 1.5 |
| Example 6 | 0.90 | 17 | 3.6 | 100 | 0 | 0 | 1.19 | 1.5 |
| Example 7 | 0.88 | 17 | 3.4 | 100 | 0 | 0 | 1.18 | 1.4 |
| Example 8 | 0.94 | 10 | 2.2 | 100 | 0 | 0 | 0.68 | 1.7 |
| Example 9 | 0.94 | 12 | 2.3 | 100 | 0 | 0 | 0.70 | 1.7 |
| Example 10 | 0.89 | 17 | 3.8 | 100 | 0 | 0 | 1.28 | 1.4 |
| Example 11 | 0.81 | 18 | 3.8 | 100 | 0 | 0 | 1.41 | 1.3 |
| Example 12 | 0.82 | 18 | 3.6 | 94 | 6 | 0 | 1.32 | 1.2 |
| Example 13 | 0.82 | 20 | 3.4 | 80 | 19 | 0 | 1.21 | 1.2 |
| Example 14 | 0.91 | 16 | 3.4 | 91 | 4 | 5 | 1.20 | 1.4 |
| Example 15 | 0.92 | 17 | 3.4 | 80 | 20 | 0 | 1.21 | 1.5 |
| Example 16 | 0.82 | 19 | 4.2 | 75 | 20 | 5 | 1.44 | 1.2 |
| Example 17 | 0.82 | 20 | 4.3 | 100 | 0 | 0 | 1.49 | 1.2 |
| Comparative Example 1 | 1.00 | 10 | 2.1 | 100 | 0 | 0 | 0.59 | 2.5 |
| Comparative Example 2 | 0.99 | 21 | 1.9 | 100 | 0 | 0 | 0.74 | 1.9 |
| Comparative Example 3 | 0.99 | 19 | 2.1 | 100 | 0 | 0 | 0.72 | 1.9 |
| Comparative Example 4 | 0.99 | 17 | 2.5 | 100 | 0 | 0 | 0.78 | 2.0 |
| Comparative Example 5 | 1.00 | 15 | 2.4 | 100 | 0 | 0 | 0.88 | 2.0 |
| Comparative Example 6 | 1.00 | 19 | 2.4 | 100 | 0 | 0 | 1.14 | 2.4 |

As shown in Tables 1 and 2, in Examples 1 to 17, water permeability and salt removal performance after abrasion were higher than those in Comparative Examples 1 to 6.

Although the present invention has been described in detail with reference to specific embodiments, it is apparent to those skilled in the art that various changes and modifications can be made without departing from the spirit and scope of the present invention. The present application is based on the Japanese patent application (Japanese Patent Application No. 2021-072381) filed on Apr. 22, 2021, and the contents thereof are incorporated herein by reference.

INDUSTRIAL APPLICABILITY

The composite semipermeable membrane according to the present invention can be particularly suitably used for desalination of seawater and brackish water.

What is claimed is:

1. A composite semipermeable membrane comprising:
   a support membrane; and
   a separation functional layer provided on the support membrane, wherein
   the separation functional layer comprises a thin membrane,
   the thin membrane has a fold structure comprising a plurality of protrusions having a height of 10 nm or more and 1000 nm or less,
   in the fold structure, a ratio (T100/T25) is 0.70 or more and less than 0.95, where T25 is a thickness of the thin membrane in a region of 0% to 25% of the height of the protrusion and T100 is a thickness of the thin membrane in a region of 50% to 100% of the height of the protrusion, and
   the thickness T25 of the thin membrane in the region of 0% to 25% of the height of the protrusion is 10 nm or more and less than 24 nm.

2. The composite semipermeable membrane according to claim 1, wherein
   the thickness T25 of the thin membrane in the region of 0% to 25% of the height of the protrusion is 13 nm or more and less than 24 nm.

3. The composite semipermeable membrane according to claim 2, wherein
   an actual length L of the thin membrane per 1 μm length of the support membrane in a cross-sectional direction perpendicular to a membrane surface is 3.0 μm or more and 100 μm or less.

4. The composite semipermeable membrane according to claim 3, wherein
in the fold structure, a ratio of the number of the protrusions having the height of 200 nm or more to the number of the protrusions having the height of 10 nm or more is 1/20 or more and 1/2 or less.

5. The composite semipermeable membrane according to claim 3, wherein
in the fold structure, a ratio of the number of the protrusions having the height of 400 nm or more to the number of the protrusions having the height of 10 nm or more is 1/20 or more and 1/5 or less.

6. The composite semipermeable membrane according to claim 4, wherein
in the fold structure, a ratio of the number of the protrusions having the height of 400 nm or more to the number of the protrusions having the height of 10 nm or more is 1/20 or more and 1/5 or less.

* * * * *